Patented Nov. 4, 1947

2,430,002

UNITED STATES PATENT OFFICE 2,430,002

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application April 2, 1945, Serial No. 586,268

7 Claims. (Cl. 252—342)

This invention relates primarily to the resolution of petroleum emulsions.

One object of our invention is to provide a novel process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing impurities, particularly inorganic salts from pipeline oil.

Demulsification, as contemplated in the present application, includes the preventive step of commingling the demulsifier with the aqueous component which would or might subsequently become either phase of the emulsion, in absence of such precautionary measure. Similarly, such demulsifier may be mixed with the hydrocarbon component.

The new material or compound herein described, particularly when employed as a demulsifying agent, consists of a water-soluble or water-wettable, or at least, hydrophile diol, which in its simplest aspect, may be exemplified by an oxyalkylated di(hydroxyalkyloxyphenyl) methane, and the fractional or total esters thereof, derived from low molal monocarboxy acids having 7 carbon atoms or less, such as acetic acid, hydroxyacetic, butyric, heptoic acid, etc.

Most of such compounds may be characterized by the following formula:

R—R$_5$—R in which R is either

R$_1$O(R$_2$O)$_n$H or

R$_1$O(R$_2$O)$_n$OCR$_6$ radicals and in which R$_5$ is a member of the class consisting of methylene and substituted methylene radicals representing the residue of low molal aldehydes; R$_1$ is a substituted monocyclic phenol radical having two of the three reactive 2, 4, 6 positions substituted by two alkyl side chains, of which at least one contains three carbon atoms and the longest of which does not contain more than eight carbon atoms; R$_2$O is an alkylene oxide radical containing at least two and not more than four carbon atoms selected from the class consisting of ethylene oxide, propylene oxide, butylene oxide, glycide and methylglycide radicals; and $n$ is a whole number varying from one to 60; R$_6$CO is the acyl radical of a low molal monocarboxy acid having not over 7 carbon atoms, with the proviso that there be present at least one polyglycol radical containing at least 8 ether linkages.

Briefly stated, the preparation of the herein contemplated compounds consists in two or three steps, the last two of which may be interrupted, so as to take place at different periods, instead of successively. The two so referred to are oxyalkylation and esterification. The first step consists in reacting 2 moles of a properly selected substituted phenol with one mole of an aldehyde, so as to produce a diphenylolmethane or substituted methane. The preferred aldehyde is formaldehyde, on account of its reactivity and low cost. Other aldehydes which may be used are acetaldehyde, propionaldehyde, butyraldehyde, and furfural. The condensation reactions of this type are well known and do not require description. In the case of furfural, it is desirable to use alkaline condensing agents, but in the other instances, acid or acidic substances are usually employed. Since these condensation reactions cannot produce resins in the usual sense, they are comparatively simple and result in oils varying from moderately viscous substances to oils so viscous as to appear to be almost solid.

The phenols are selected so that resinification does not take place, insofar that the phenols are limited to types in which there is only one reactive nuclear hydrogen atom. Specifically, then, the phenols may be indicated by the following formula:

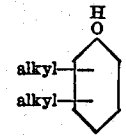

with the proviso, that the two alkyl groups occupy two of the 2, 4, 6 positions, and that at least one of the alkyl side chains contains three carbon atoms and the longest alkyl side chain does not contain more than 8 carbon atoms. When 2 moles of such phenol are condensed in the customary manner with a reactive aldehyde, one obtains a substituted diphenylol methane or substituted methane of the following formula:

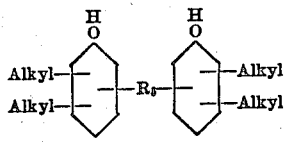

in which $R_5$ is a methylene radical, or a substituted methylene radical which represents the residue of an aldehyde and is preferably the unsubstituted methylene radical derived from formaldehyde.

As to various suitable phenols, we prefer to use 2-4-diamyl phenol or p-tert-butyl-o-cresol. Other suitable phenols include

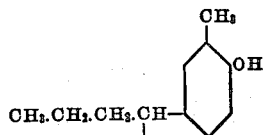

(1-methyl-butyl)-ortho-cresol

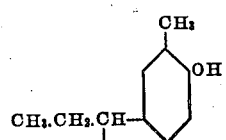

(1-ethyl-propyl)-ortho-cresol

See U. S. Patent No. 2,073,995, dated March 16, 1937, to Raiziss et al. See also U. S. Patent No. 2,106,760, dated February 1, 1938, to Raiziss et al.

Other phenols can be prepared by the alkylation of ortho- or paracresol by the same procedure as is employed for the alkylation of phenol. See U. S. Patent No. 2,060,573, dated November 10, 1936, to Hester.

We have found that 2,4-dipropylphenol is also an excellent raw material. See also U. S. Patents Nos. 2,064,885, dated December 22, 1936, to Carpenter; 2,104,412, dated January 4, 1938, to Buc, and 2,207,753, to Moyle et al., dated July 16, 1940.

It is understood that there is no objection to the presence of an additional alkyl radical, provided its presence still leaves a reactive nuclear hydrogen atom. Such alkyl radical, if present, is limited to radicals having not over 8 carbon atoms, and must occupy one of the 3 or 5 positions. For all practical purposes, however, such compounds are derived from metacresol or similar homologs, and thus, for the sake of brevity in the hereto appended claims, such alkyl groups will be indicated as being in either the 3 position, or in the 5 position. For the sake of convenience, however, it is understood that the 3 and 5 positions are the obvious equivalents. One such example would be the product obtained by the propylation of metacresol. The meta group does not occupy a reactive position, and its presence does not interfere with the subsequent reaction. In a few instances compounds are obtainable where a cyclic radical may serve instead of an alkyl radical, for example, in 4-tert-butyl-2-phenylphenol or 4-tert-butyl-2-cyclohexyl-phenol.

Since the substituted phenols employed as reactants are invariably water-insoluble, and since formaldehyde, a water-soluble aldehyde, is the preferred reactant for introducing the methylene bridge or its equivalent, we have found it most desirable to employ the procedure described in U. S. Patent No. 2,330,217, dated September 28, 1943, to Hunn. Briefly stated, this procedure includes the use of an acid catalyst, along with an emulsifying agent to promote emulsification, and thus, reaction between the water-insoluble phenol and the water-soluble aldehyde. As an example of such procedure, the following is included:

PHENOL ALDEHYDE CONDENSATION

Example 1

| | Pounds |
|---|---|
| Diamyl (2,4) phenol | 702 |
| Formalin 40% U. S. P | 114 |
| Concentrated hydrochloric acid | 3.3 |
| Alkylated aryl sulphonic acid salt (Nacconal N. R. S. F.) | 3.3 |

The mixture is stirred vigorously under a reflux condenser at approximately 105° C. for approximately 2 hours. The temperature is then raised to approximately 150–160° C. and held at this temperature for about the same period of time. Afterwards, water is distilled over and eliminated. Part of the water may be conveniently distilled over while the reaction mass is being raised from the temperature of approximately 105° C. to 150° C., or thereabouts, or while it is being held at approximately 150° C.

PHENOL ALDEHYDE CONDENSATION

Example 2

The same procedure is employed as in the previous example, except that 618 pounds of dipropyl(2,4) phenol replaces the 702 pounds of diamylphenol used in the preceding example.

PHENOL ALDEHYDE CONDENSATION

Example 3

The same procedure is followed as in the two previous examples, except that one uses a mixture consisting of 551 pounds of diamyl(2,4) phenol and 309 pounds of dipropyl(2,4) phenol. The result of such mixture is that the condensate is also a mixture of which one-third corresponds to Example 1, preceding, one-third to Example 2, preceding, and the remaining third represents the type of compound in which the phenol nuclei are different, one being an amylated nucleus and the other a propylated nucleus.

Due to ready availability, and other desirable properties, it is particularly convenient and economical to replace dipropyl(2,4) phenol with an equivalent amount of 4,6-di-tertiary-butyl-m-cresol which is indicated by the following formula:

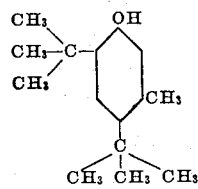

Instead of using the emulsification procedure, one may, of course, employ another well known method, to wit, the use of an alkaline catalyst in excess, particularly in amounts sufficient to dissolve or solubilize the water-soluble phenol. Usually, a 10% sodium hydroxide solution is used to dissolve the substituted phenol. For complete details see, for example, Industrial & Engineering Chemistry, volume 24, No. 4, page 442; volume 29, No. 8, page 860; and No. 11, pages 1125 and 1305. Particular attention is directed to volume 29, No. 8, page 862. The author of all these articles is F. S. Granger.

It is well known that various hydroxy hydrocarbon compounds, for instance, long chain alcohols, hydroxylated alicyclic compounds, phenols, and the like, can be treated with materials such as ethylene oxide, propylene oxide, butylene oxide, amylene oxide, glycide, epichlorhydrin, and the like, to produce glycol ethers. For purposes of convenience, reference to an alkylene oxide is intended to mean the type commonly referred to as an alpha-beta alkylene oxide, i. e., where an oxygen atom represents a linkage between two adjacent carbon atoms, although the oxygen linkage does not necessarily involve a terminal carbon atom. Any functional equivalents, such as glycide, epichlorhydrin, or the like, are intended to be included within the expression "alkylene oxide," as employed in the hereto appended claims. The introduction of the polymerized alkylene oxide chain or recurring ether linkage, converts a water-insoluble phenol of the kind described into a water-soluble product.

Oxyalkylation of water-insoluble hydroxy hydrocarbons of the kind previously referred to, in order to render the same water-soluble, and more particularly, in order to render them surface-active, is a well-known procedure. An alkylene oxide may be added in gaseous or liquid phase to the liquid or melted phenolic body of the kind described at a temperature at which the alkylene oxide is absorbed by the phenol and which generally lies between 50° C. and 250° C. It is usually preferable to cause the phenolic body to react with the selected alkylene oxide in a closed vessel so constructed that suitable pressure may be employed, for instance, a pressure varying, for example, from 100 pounds gauge pressure to 1000 pounds gauge pressure. It is often desirable to apply heat in the initial stage of the reaction and then depend on the heat of reaction to complete combination. In some instances, it is necessary to slow the reaction speed by means of a suitable cooling system. In these reactions the length of the polyglycol ether chain is determined by the proportion of alkylene oxide caused to react. In any event, the amount employed must be sufficient to produce water solubility, but not in such proportions that surface activity is lost. This particular point will be discussed in detail subsequently. It is well known that various catalysts may be employed for the formation of the polyethers; and the particularly desirable catalysts will include caustic alkalies, alkali alcoholates, tertiary non-hydroxylated organic bases, and the like; and furthermore, in some instances at least, acid compounds such as potassium bisulfate may be employed.

The present invention is characterized by the fact that we have discovered that a very narrow specific class of a certain type of phenol, upon oxyalkylation, with or without subsequent acylation, as described, yields an unusually effective demulsifying agent. This particular narrow class or species or sub-species is markedly more effective and more valuable as a demulsifier than the members of the broad class or division. Apparently, an examination of the chemical properties, chemical structure, or physical properties of this particular type of oxyalkylated phenol fails to reveal any particular characteristic which can account for such unusual effectiveness as a demulsifier.

The phenols employed are diphenylol methanes or higher methane homologs. Their structure has been previously characterized by the following formula, in which $R_5$ has its previous significance:

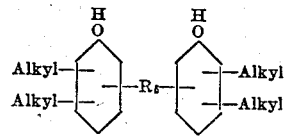

The method of preparation has been previously indicated and involves a phenol-aldehyde, and particularly a phenol-formaldehyde condensation reaction.

It is to be noted that such phenolic body is water-insoluble prior to treatment with an alkylene oxide and that it becomes water-soluble upon treatment with an alkylene oxide or its equivalent. It should be noted that the treatment with an alkylene oxide or its equivalent is necessary in all instances to produce water solubility, or at least, self-emulsifiability; yet excessive treatment should be avoided, in that the compound may become too hydrophile. Generally speaking, it is safe to treat the water-insoluble phenol with ethylene oxide, so as to increase its weight not less than 150%, and usually, not more than 250% and possibly 300% in some cases. Such procedure is generally a satisfactory guide; and if some other alkylene oxide is employed, for instance, propylene oxide, then, of course, an increased amount of alkylene oxide must be employed, based on the increased molecular weight of the propylene oxide, and the like, and also based on the fact that its solubilizing effect per mole is somewhat less than that of ethylene oxide. If too great an amount of ethylene oxide is used, the resultant product passes through a water-soluble, surface-active stage, and then reaches an advanced stage, where it is water-soluble but substantially free from surface activity. Generally speaking, 12 to 30 moles of ethylene oxide or the equivalent per mole of substituted methane is sufficient. As the carbon atoms in the alkyl chain increase, for instance, where a disubstituted cresol instead of the analogous phenol is employed, and particularly in conjunction with a higher aldehyde, the amount must be increased.

Another convenient guide is that for each carbon atom present in the original water-insoluble phenol-substituted methane, one must add one-half molecular proportion of ethylene oxide, and possibly, a greater amount when an alkylene oxide of higher molecular weight is employed. It must also be remembered that the solubility of the product obtained varies somewhat with the method of manufacture, and the particular catalyst which is present. It may be well to indicate that this is one of the reasons that the exact composition of the compounds cannot be indicated as satisfactorily as might be desired in all instances. If solubility is not obtained with any other alkylene oxide, then ethylene oxide should be employed, because it appears to be best suited, for the reason that it reacts most readily, and because it promotes water-solubility to a greater degree than other alkylene oxides or the equivalent. Glycide, of course, or a similar compound, is just as satisfactory as ethylene oxide. In any event, water-solubility can always be obtained; and the range of surface activity is such that there is no difficulty in stopping short of the point where surface activity will disappear, due to the presence of unusually excessive hydrophile properties.

It may be well to emphasize what has been said previously in regard to surface activity of the water-soluble compound. If a dilution of the water-soluble reaction product of one part in 3,000, or one part in 5,000, or one part in 20,000, no longer shows any decrease in the surface tension of the resulting solution, as compared with the raw water from which it was prepared, then one has obtained a water-soluble product from the parent water-insoluble material; but surface activity has been destroyed, due to the introduction of an extremely hydrophilic property. Needless to say, such product should be removed and the changes made in the introduction of the alkylene oxide, along the lines previously indicated, so as to obtain a product which is water-soluble, water-wettable, or self-emulsifiable, and also surface-active. In order that it be understood that such extremely hydrophilic compounds are not contemplated for use in the herein described process, for resolving petroleum emulsions, it should be noted that the hereto appended claims are limited to the surface-active type.

Furthermore, it is to be pointed out that the products herein contemplated are not limited to any particular method of manufacture. It may be desirable to react the ethylene oxide with the selected phenolic bodies in several stages and to test the material at the end of each stage. In other words, oxyalkylation may be carried out in a two-stage process, a three-stage process, a four-stage process, or the like. This will be obvious to a person skilled in the art. Furthermore, it is not necessary that all stages be carried out with the same alkylene oxide. For instance, the first stage might be conducted with propylene oxide or butylene oxide, and subsequent stages, with ethylene oxide. Indeed, we have found it most convenient to treat the selected phenol with one mole of the alkylene oxide, such as ethylene oxide, and then employ the hydroxy ether so obtained as a raw material for subsequent oxyalkylation.

The type of compound free from acyl radicals may be exemplified by the following:

OXYALKYLATED DIOL

Example 1

200 parts of a condensation product such as that exemplified by "Phenol aldehyde condensation, Example 1," is treated with approximately 150 pounds of ethylene oxide in two 75 pound portions, in the presence of one-half of 1% of sodium methylate; as the reaction proceeds the sodium methylate either dissolves, or is converted into a soluble compound by chemical combination. Reaction is conducted at approximately 125° C. and 100–200 pounds gauge pressure for approximately 2½ to 4 hours, until the reaction appears to be complete, as indicated by the pressure dropping to zero. The actual ratio of reactants is approximately 8 to 1. The initial reaction conducted between 1 mole of the condensate and two moles of ethylene oxide may be indicated thus:

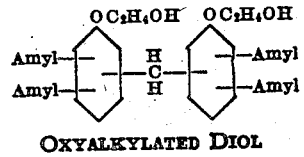

OXYALKYLATED DIOL

Example 2

The same procedure is followed as in the preceding example, except that a third portion of ethylene oxide, 75 pounds by weight, is employed in addition.

OXYALKYLATED DIOL

Example 3

The same procedure is followed as in the prior example, except that a fourth addition of ethylene oxide (75 pounds) is introduced. The product so obtained represents an increase in weight, due to ethylene oxide equivalent to 150%, by weight, of the original phenolic reactant.

OXYALKYLATED DIOL

Example 4

The same procedure is followed as in the prior examples, except that instead of employing the phenolic aldehyde condensation product exemplified by Example 1 preceding, one employs instead an equal weight (200 pounds) of a condensation product exemplified by either "Phenol aldehyde condensation, Example 2," or by "Phenol aldehyde condensation, Example 3."

OXYALKYLATED DIOL

Example 5

One follows the same procedure as in Examples 1, 2 and 3, preceding, except that one prepares a phenol aldehyde condensation product following the derivative made under the heading "Phenol aldehyde condensation, Example 1," except that an equimolecular amount of 4,6-di-tertiary-butyl-m-cresol is used instead of diamyl(2,4) phenol.

OXYALKYLATED DIOL

Example 6

The same procedure is employed as in the five preceding examples, except that propylene oxide is used and in each addition the amount is one-third more than the equivalent amount of ethylene oxide used. For instance, 240 pounds of propylene oxide are employed instead of 175 pounds of ethylene oxide or 100 pounds of propylene oxide are used instead of 75 pounds of ethylene oxide.

OXYALKYLATED DIOL

Example 7

The same procedure is followed as in Examples 1 to 5, preceding, except that butylene oxide is employed instead of ethylene oxide. For instance, instead of 175 pounds of ethylene oxide, one employs 265 pounds of butylene oxide, and instead of 75 pounds of ethylene oxide, one employs 150 pounds of butylene oxide.

It has been pointed out previously that the diols may be converted into fractional or total esters by reaction with monocarboxy acids having seven carbon atoms or less. Such derivatives modify the hydrophile hydrophobe balance to a slight degree, and in some instances, give enhanced surface-active effect, particularly when used as a demulsifier. It has been suggested that such improvement for some purpose resides in decreasing or eliminating formation of the hydrogen bond or bridge between two molecules of the same compound. For instance, compare with the difference in certain properties of ethylene glycol and ethylene glycol monoacetate or ethylene glycol diacetate.

Oxyalkylated Diol Fractional Ester

Example 1

An oxyalkylated diol, as, for example, a product of the kind described under the heading "Oxyalkylated diol, Example 1" is analyzed to determine the hydroxyl value. To a suitable amount of diol, for instance, 300 pounds, there is added sufficient anhydrous acetic acid to react with one, and only one, of the two hydroxyl radicals. This esterification is conducted in the usual manner using a temperature of 120° C., or thereabouts, and if desired, one may add a small amount of catalyst, for instance, one half percent of toluene sulfonic acid, and alkyl phosphoric acid, or the like. Dry hydrochloric acid gas may also be used as the catalyst. The completeness of reaction can be predetermined if desired, by condensation of the water, or else, by a hydroxyl determination during the course of reaction. As has been previously pointed out, the surface-active effect of the diol is frequently enhanced, at least for some purposes, by conversion into a fractional ester in the manner indicated.

Oxyalkylated Diol Fractional Ester

Example 2

The same procedure is followed as in the preceding example, but instead of using a diol of the kind exemplified by "Oxyalkylated diol, Example 1," there is employed instead a diol of the kind exemplified under the headings "Oxyalkylated diol, Examples 2 to 7," inclusive.

Oxyalkylated Diol Fractional Ester

Example 3

The same procedure is followed as in the two preceding examples, except that other monocarboxy low molal acids having 7 carbon atoms or less are employed instead of acetic acid. Such acids include, among others, hydroxyacetic, lactic, butyric, propionic, heptoic, etc.

Oxyalkylated Diol Fractional Ester

Example 4

Reactions of the kind previously described are conducted, using the acyl chloride instead of the acid, with the liberation of hydrochloric acid instead of water. For instance, acetyl chloride may be used instead of acetic acid. The acyl chloride should be added slowly to the dihydroxyalkyloxyphenyl methane with constant and vigorous stirring. Hydrochloric acid is formed and should be vented and disposed of in a suitable manner. If the reaction does not take place promptly, the temperature should be raised moderately, for instance, 5° to 15° C., or a bit higher, until the reaction proceeds smoothly. However, as soon as the reaction does start, the temperature should be lowered until the reaction proceeds at the slowest feasible rate. Generally, this means use of proper cooling devices or controlled slow addition of the acyl chloride. Completeness of the reaction can be determined in any suitable manner, such as a check on the amount of hydrochloric acid eliminated, or the drop in hydroxyl value of the reactant mixture. When the reaction is complete, any hydrochloric acid gas dissolved in the reaction mass should be eliminated by passing an inert gas such as carbon dioxide, through the mixture.

As has been suggested previously, the reaction between the diol and low molal monocarboxy acid, may be so conducted that one obtains a total or complete ester, rather than a fractional ester. As a matter of fact, such reaction can be conducted more readily than in the formation of a fractional ester, for the reason that an excess of the acylating agent is not objectionable.

This suggests, among other things, the use of the acid anhydride, for instance, acetic anhydride, in excess. Furthermore, such reaction can be conducted by simply refluxing the diol with an excess of the reactant, such as acetic anhydride, with subsequent elimination of the excess of reactant by distillation, preferably under vacuum. This may be illustrated in the following manner:

Oxyalkylated Diol Total Ester

Example 1

The same diol is used as described under the heading "Oxyalkylated diol fractional ester, Example 1." Having determined the hydroxyl value, one adds a comparatively large excess of the acetic anhydride, for instance, 3 to 5 moles of acetic anhydride for each mole of diol, and refluxes for approximately 3 to 5 hours. At the end of this time, the mixture of acetic anhydride and acetic acid are distilled off, preferably under vacuum. Such procedure yields a total or complete ester. The reaction proceeds even in absence of the catalyst, but is accelerated by the use of a catalyst of the kind previously described.

Oxyalkylated Diol Total Ester

Example 2

The same procedure is employed as in the preceding example, except that one employs as reactants the various diols described under the headings "Oxyalkylated diol, Examples 2 to 7," inclusive.

Oxyalkylated Diol Total Ester

Example 3

The same procedure is followed as in the two preceding examples, except that one employs any one of the following anhydrides: Propionic anhydride, butyric anhydride, isobutyric anhydride, valeric anhydride, or benzoic anhydride.

Oxyalkylated Diol Total Ester

Example 4

The same procedure is employed as in previous examples, except that instead of employing the acid or acetic anhydride, one employs instead the acyl chloride in the manner described under the heading "Oxyalkylated diol fractional ester, Example 4," preceding. Among the acyl halides one may employ, are the following: acetyl chloride, propionyl chloride, butyryl chloride, isobutyryl chloride, valeryl chloride, and benzoyl chloride.

Attention is directed to the fact that the previous examples are the type in which the molecule may be considered as a symmetrical molecule, from the standpoint that the nucleus has two polyglycol side chains, both of which are the same length or substantially the same length. This applies, without restriction as to whether or not a low molal monocarboxy acyl group is introduced or not. Obviously, however, by conducting the oxyalkylation in more than one step, or, more specifically, in two steps, one can obtain the type of compound in which the hydrophile polyglycol radical is entirely on one side of the central nucleus, or divided irregularly between two side chains.

Such variants are illustrated in the following examples:

NON-SYMMETRICAL FRACTIONAL ESTER

Example 1

The same procedure is followed as in the manufacture of the "Oxyalkylated diol, Example 1," except that only two moles of the oxyalkylating agent, such as ethylene oxide, are employed. Such reaction may be illustrated in the following manner:

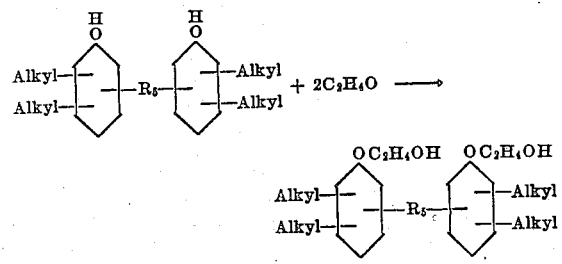

Having obtained such diol, the product is then esterified with any one of the low molal acids, or acyl chlorides previously described, so as to yield the fractional ester. The reaction may be exemplified by the use of acetic acid in the following manner:

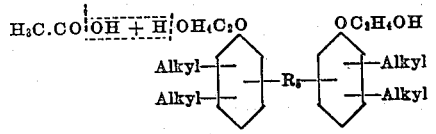

Having obtained such a product, it is then subjected to reaction in the same identical manner as described under the headings "Oxyalkylated diol, Examples 1 to 3," and "Oxyalkylated diol, Examples 6 and 7." When such a reaction is so conducted, substantially all of the oxyalkylating agent, in fact, all except one mole, appears on one side of the central nucleus only, and in fact, the single mole appearing on the other side is part of an ester linkage and not part of a repetitious ether linkage. Obviously, any of the low molal monocarboxy acids, or their equivalents previously described, may be employed.

NON-SYMMETRICAL FRACTIONAL ESTER

Example 2

The same procedure is followed as in the preceding example, except that one employs as a raw material phenol aldehyde condensation products of the kind employed in the manufacture of "Oxyalkylated diol, Example 4," or "Oxyalkylated diol, Example 5."

NON-SYMMETRICAL FRACTIONAL ESTER

Example 3

One employs the same raw materials as in Examples 1 and 2, preceding, but instead of conducting the oxyalkylation so as to introduce all of the oxyalkyl radicals on one side of the nucleus, the oxyalkylation is conducted so as to introduce the polyglycol radicals unsymmetrically; for example, one decides on the total amount of oxyalkylating agent to be introduced, and then introduces one-fifth of such amount, monoacylates with the low molal monocarboxy acid, or its equivalent, and then introduces the remainder of the oxyalkylating agent. Similarly, one can introduce one-fourth of the total amount or one introduces one-third of the total amount, or 40% of the total amount. Thus, one can employ predetermined ratios and obtain a balance in hydrophile groups varying from one hundred percent on one side to zero on the other, up to the point where the compound becomes symmetrical or evenly balanced in regard to the polyglycol radicals.

NON-SYMMETRICAL TOTAL ESTER

Example 1

Obviously having obtained the fractional ester in the manner described, one can convert the fractional ester into a total ester by a second acylation step, in which an excess of acylating agent may be employed. In light of the rather complete description, and since the same reagents and reactants are employed, it is believed that further elaboration is not necessary. Briefly, one may treat one mole of any of the fractional esters previously described immediately preceding with one or more moles, preferably in excess of any of the low molal monocarboxy acids, or their equivalents, previously described, and then remove the excess of reactant, preferably by distillation under vacuum. Such procedure, as well as the procedure employed to produce the unsymmetrical fractional ester compound, often results in compounds of unusual effectiveness for surface-active agents.

The procedures above described result in the formation of a variety of hydrophile compounds. Such hydrophile properties may vary from the state where the compound shows a tendency to be wetted by water, i. e., shows a comparatively low interfacial tension towards water, through the stage where it is dispersible with water, or produces a sol or even a clear solution. The comparatively low interfacial tension which the products exhibit towards water in such instances where they are not completely soluble, for instance, 10 to 20 dynes per centimeter, or less, is still a distinct indication of hydrophile character and sufficient to control or determine orientation at interfaces.

Thus, the herein contemplated products may be characterized as hydrophile compounds of the formula

in which R is a member of the class consisting of

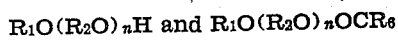

radicals, in which $R_5$ is a member of the class consisting of methylene and substituted methylene radicals representing the residue of low molal aldehydes; $R_1$ is a substituted monocyclic phenol radical having two of the three reactive 2, 4, 6 positions substituted by two alkyl side chains, of which at least one contains three carbon atoms and the longest of which does not contain more than eight carbon atoms; $R_2O$ is an alkylene oxide radical containing at least two and not more than four carbon atoms selected from the class consisting of ethylene oxide, propylene oxide, butylene oxide, glycide and methylglycide radicals;

and $n$ is a whole number varying from 1 to 60; $R_6CO$ is the acyl radical of a low molal monocarboxy acid having not over 7 carbon atoms, with the proviso that there must be present at least one polyglycol radical containing at least 8 ether linkages. The new materials herein described form the subject matter of our co-pending divisional application Serial No. 630,975, filed November 26, 1945.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process for resolving emulsions, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process, is based upon its ability to treat certain emulsions more advantageously and at a somewhat lower cost than is possible with other available demulsifiers or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible, when the demulsifier is used in connection with acidification of calcareous oil-bearing strata, especially if suspended in or dissolved in the acid employed for acidification.

A somewhat analogous use of our demulsifying agent is the removal of a residual mud sheath which remains after drilling a well by the rotary method. Sometimes the drilling mud contains added calcium carbonate or the like to render the mud susceptible to reaction with hydrochloric acid or the like, and thus expedite its removal.

One preferred and more narrow aspect of our invention, insofar as it is concerned with demulsification of petroleum emulsions of the water-in-oil type, is concerned with the admixture of the oxyalkylated compound, as described, with a viscosity-reducing solvent, such as the various solvents enumerated, particularly aromatic solvents, alcohols, ether alcohols, etc., as previously specified. The word "solvent" is used in this sense to refer to the mixture, if more than one solvent is employed, and generally speaking, it is our preference to employ the demulsifier in a form representing 40% to 85% demulsifier and 15% to 60% solvent, largely, if not entirely, non-aqueous and so selected as to give a solution or mixture particularly adaptable for proportional pumps or other measuring devices. The following examples will illustrate this aspect of our invention:

DEMULSIFIER

*Example 1*

| | Per cent |
|---|---|
| Oxyalkylated diol, Example 1 | 60 |
| Xylene | 20 |
| Methyl alcohol | 20 |

DEMULSIFIER

*Example 2*

| | Per cent |
|---|---|
| Oxyalkylated diol, Example 3 | 65 |
| Denatured alcohol | 10 |
| Ethylene glycol diethyl ether | 25 |

DEMULSIFIER

*Example 3*

| | Per cent |
|---|---|
| Oxyalkylated diol fractional ester, Example 1 | 55 |
| Denatured alcohol | 25 |
| Diethylene glycol monoethyl ether | 15 |
| Water | 5 |

DEMULSIFIER

*Example 4*

| | Per cent |
|---|---|
| Oxyalkylated diol total ester | 70 |
| Butyl alcohol | 5 |
| Diethylene glycol monobutyl ether | 25 |

The above percentages are by weight.

Having thus described our invention, what we claim as new and desire to secure by Letters Patent is:

1. A process for breaking petroleum emulsions of the water-in-oil type, characterized by subjecting the emulsion to the action of a demulsifier comprising a surface-active hydrophile compound of the formula $$R-R_5-R$$

in which R is a member of the class consisting of $R_1O(R_2O)_nH$ and $R_1O(R_2O)_nOCR_6$ radicals in which $R_5$ is a member of the class consisting of methylene and substituted methylene radicals representing the residue of low molal aldehydes; $R_1$ is a substituted monocyclic phenol radical having 2 of the 3 reactive 2, 4, 6 positions substituted by two alkyl side chains, of which at least one contains 3 carbon atoms and the longest of which does not contain more than 8 carbon atoms with the proviso that one of the two said alkyl side chains be in the para position; $R_2O$ is an alkylene oxide radical containing at least 2 and not more than 4 carbon atoms selected from the class consisting of ethylene oxide, propylene oxide, butylene oxide, glycide and methylglycide radicals; and $n$ is a whole number varying from 1 to 60; $R_6CO$ is the acyl radical of a low molal monocarboxy acid having not over 7 carbon atoms, with the proviso that there must be present at least 1 polyglycol radical containing at least 8 ether linkages.

2. A process for breaking petroleum emulsions of the water-in-oil type, characterized by subjecting the emulsion to the action of a demulsifier comprising a surface-active water-soluble compound of the formula $$R-R_5-R$$

in which R is a member of the class consisting of $R_1O(R_2O)_nH$ and $R_1O(R_2O)_nOCR_6$ radicals, in which $R_5$ is a member of the class consisting of methylene and substituted methylene radicals representing the residue of low molal aldehydes; $R_1$ is a substituted monocyclic phenol radical having 2 of the 3 reactive 2, 4, 6 positions substituted by 2 alkyl side chains, of which at least 1 contains 3 carbon atoms and the longest of which does not contain more than 8 carbon atoms with the proviso that one of the two said alkyl side chains be in the para position; $R_2O$ is an alkylene oxide radical containing at least 2 and not more than 4 carbon atoms selected from the class consisting of ethylene oxide, propylene oxide, butylene oxide, glycide and methylglycide radicals; and $n$ is a whole number varying from 1 to 60; $R_6CO$ is the acyl radical of a low molal monocarboxy acid having not over 7 carbon atoms, with the proviso that there must be present at least one polyglycol radical containing at least 8 ether linkages.

3. The process of claim 2, wherein the alkylene oxide radical is the ethylene oxide radical.

4. The process of claim 2, wherein the alkylene oxide radical is the ethylene oxide radical and all alkyl radicals are amyl radicals.

5. The process of claim 2, wherein the alkylene oxide radical is the ethylene oxide radical, all alkyl radicals are amyl radicals, and there are present two occurrences of $R_6CO$.

6. The process of claim 2, wherein the alkylene oxide radical is the ethylene oxide radical, all alkyl radicals are amyl radicals, and there is present one occurrence of $R_6CO$.

7. The process of claim 2, wherein the alkylene oxide radical is the ethylene oxide radical, all alkyl radicals are amyl radicals, and there is a complete absence of the radical $R_6CO$.

MELVIN DE GROOTE.
BERNHARD KEISER.

REFERENCES CITED

The following references are of record in the file of this patent:

UNITED STATES PATENTS

| Number | Name | Date |
|---|---|---|
| 1,990,985 | Fonrobert et al. | Feb. 12, 1935 |
| 2,130,527 | Coleman et al. | Sept. 20, 1938 |
| 2,243,330 | De Groote et al. | May 27, 1941 |
| 2,278,838 | De Groote et al. | Apr. 7, 1942 |
| 2,317,726 | Boedeker et al. | Apr. 27, 1943 |
| 2,330,474 | De Groote | Sept. 28, 1943 |
| 2,331,265 | Coleman et al. | Oct. 5, 1943 |
| 2,385,970 | De Groote et al. | Oct. 2, 1945 |

FOREIGN PATENTS

| Number | Country | Date |
|---|---|---|
| 838,995 | France | Dec. 16, 1938 |